(12) United States Patent
Nguyen

(10) Patent No.: US 6,641,110 B1
(45) Date of Patent: Nov. 4, 2003

(54) BINARY BALANCE SEAL ASSEMBLY

(76) Inventor: Nhan V. Nguyen, 5 Condor La., Aliso Viejo, CA (US) 92656

( * ) Notice: Subject to any disclaimer, the term of this patent is extended or adjusted under 35 U.S.C. 154(b) by 38 days.

(21) Appl. No.: 10/127,231

(22) Filed: Apr. 22, 2002

(51) Int. Cl.[7] .............................................. F16K 39/00
(52) U.S. Cl. ...................................... 251/282; 251/281
(58) Field of Search ................................. 251/281–283

(56) References Cited

U.S. PATENT DOCUMENTS

| | | | | |
|---|---|---|---|---|
| 3,858,607 A | * | 1/1975 | Baker ........................ | 251/282 |
| 4,137,934 A | * | 2/1979 | Rice et al. ................... | 251/282 |
| 5,178,363 A | * | 1/1993 | Icenhower et al. ......... | 251/283 |
| 5,540,412 A | * | 7/1996 | Doll ............................ | 251/282 |
| 5,722,637 A | | 3/1998 | Faramarzi et al. | |
| 6,283,152 B1 | * | 9/2001 | Corte, Jr. et al. ........... | 251/282 |

* cited by examiner

*Primary Examiner*—Paul J. Hirsch
(74) *Attorney, Agent, or Firm*—Stetina Brunda Garred & Brucker

(57) ABSTRACT

A binary balance seal assembly for use in a balanced pressure valve having a valve housing and a valve plug movable within the housing between an open position and a closed position. The seal assembly comprises an annular primary seal which is adapted to be retained within the valve housing. The primary seal is deformable into sealed engagement with the outer surface of the valve plug when pressure is applied to the primary seal as occurs upon the movement of the valve plug from its closed position toward its open position. In addition to the primary seal, the seal assembly includes an annular secondary seal which is adapted to be retained within the valve plug itself. The secondary seal is movable into sealed engagement with a portion of the valve housing when the valve plug is moved to its closed position so as to prevent upstream pressure from causing fluid to leak downstream of the valve plug.

13 Claims, 4 Drawing Sheets

BINARY BALANCE SEAL ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to valve seals, and more particularly to a binary balance seal assembly for use in valves particularly suited for cryogenic service.

There is currently known in the prior art valves which include pressure balanced shafts and plugs that are displaced during normal operation of the valve. A balanced shaft or plug typically includes holes or apertures through its length to ensure that pressure forces are balanced on either side of the shaft or plug. This balancing of pressure forces significantly reduces the force required to actuate the valve, and more particularly the movement of the plug between its open and closed positions. These particular types of valves include a "balance seal" which extends about and is engageable to the plug to prevent fluid from upstream pressure leaking downstream of the plug. The balanced plugs are typically located in a pipe or ducting system in order to control fluid flow by essentially blocking that flow to varying degrees. The plugs are themselves typically fabricated from sturdy blocks of metal and moved by rods into and out of the fluid flow.

Balance seals as known in the prior art are often formed to include a portion which is deformed or deflected when exposed to pressure such that the deflected or deformed portion moves into sealed engagement with the valve plug. As such, the balance seal is often fabricated from a soft material to provide the requisite level of flexion/deformability. However, a problem arises when the valve including the balanced plug is used in cryogenic service applications wherein the temperature of the fluid flowing through the valve is about −50° Fahrenheit or below. In these extremely low temperature ranges, the material of the balance seal loses its softness/resiliency, and thus its ability to expand or deflect into sealed engagement with the outer surface of the valve plug, particularly at low pressures of about five PSI or less. As will be recognized, the insufficiency of the sealed engagement between the balance seal and the valve plug facilitates the undesirable leakage of upstream pressure to downstream of the plug. The present invention is adapted to overcome this deficiency by providing a binary balance seal assembly having particular utility for use in valves including balanced plugs intended for use in cryogenic service, and adapted to prevent the above-described leakage problem typically encountered with existing balance seals.

BRIEF SUMMARY OF THE INVENTION

In accordance with the present invention, there is provided a binary balance seal assembly for use in a balanced pressure valve specifically suited for cryogenic service. The valve itself includes a valve housing and a generally cylindrical valve plug which is movable within the valve housing between an open position and a closed position. More particularly, the valve plug resides within an internal chamber which is at least partially defined by an interior surface of the valve housing. Such interior surface includes an annular ramped portion.

The seal assembly of the present invention comprises an annular, energized primary seal which is adapted to be retained within the valve housing. The primary seal defines a central opening which is sized to accommodate the valve plug, and an annular seal well which is separated from the central opening by a deformable seal leg. The primary seal is oriented within the valve housing such that the movement of the valve plug from its closed position toward its open position facilitates the application of pressure to the primary seal, and more particularly to the interior of the seal well defined thereby. The application of pressure to the seal well of the primary seal facilitates the expansion or deformation of the seal leg into sealed engagement with the outer surface of the valve plug.

In addition to the primary seal, the seal assembly includes an annular, non-energized secondary seal which is adapted to be retained within the valve plug. The secondary seal has a generally rectangular cross-sectional configuration, and is oriented within the valve plug so as to be brought into sealed engagement with the ramped section of the interior surface of the valve housing when the valve plug is moved to its closed position. When brought into sealed engagement with the ramped section of the interior surface, the secondary seal effectively prevents upstream fluid from leaking to downstream of the valve plug. The primary and secondary seals are preferably fabricated from the same material, and more particularly a virgin polytetrafluoroethylene.

Further in accordance with the present invention, there is provided a balanced pressure valve having the above-described structural attributes, and including the above-described binary balance seal assembly comprising the primary and secondary seals.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
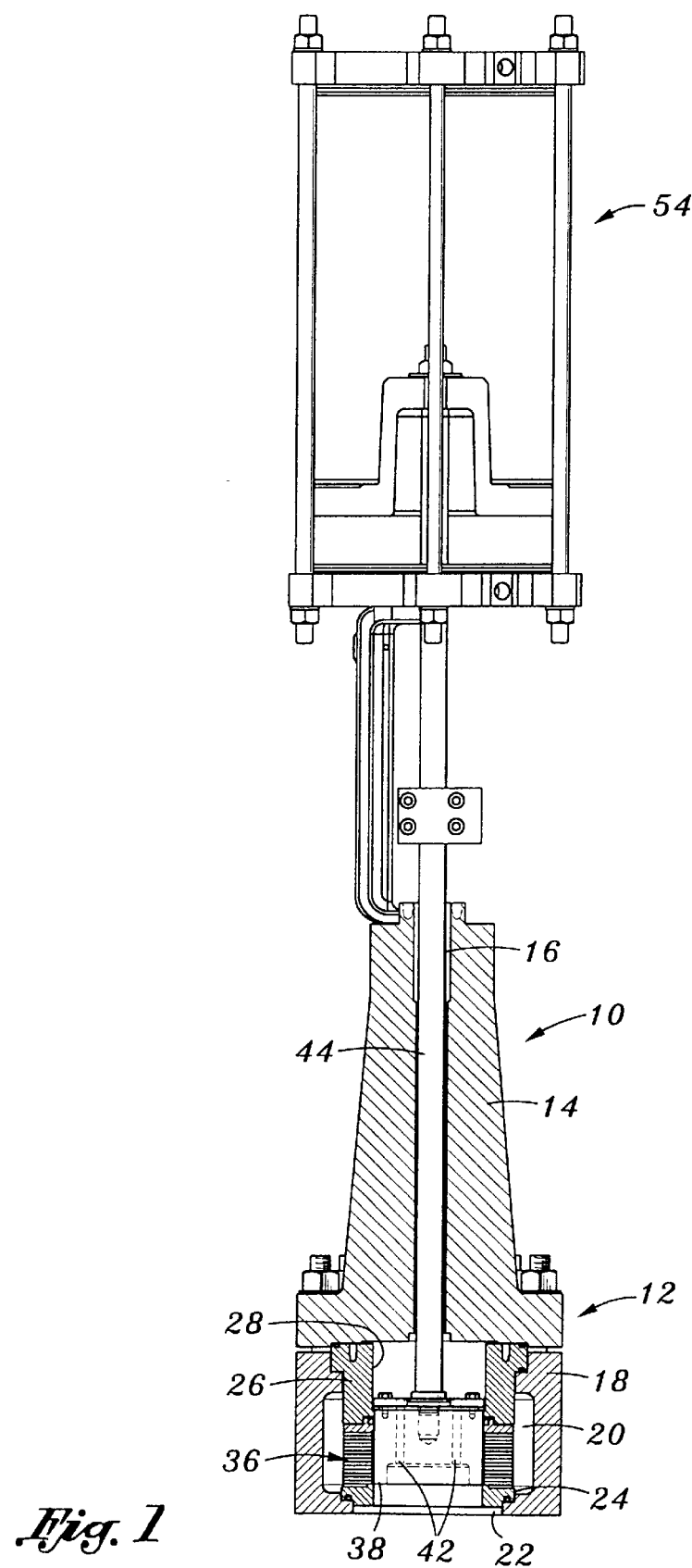
FIG. 1 is a partial cross-sectional view of a valve arrangement including the binary balance seal assembly of the present invention, the primary seal of the binary balance seal assembly being in an over plug flow orientation.

Referring now to the drawings wherein the showings are for purposes of illustrating a preferred embodiment of the present invention only, and not for purposes of limiting the same, FIG. 1 illustrates an exemplary valve arrangement 10 which includes the binary balance seal assembly constructed in accordance with the present invention, the structural and functional attributes of which will be discussed in more detail below. The valve arrangement 10 is specifically suited for use in cryogenic service applications wherein the temperature of the fluid flowing through the valve arrangement 10 is about −50° Fahrenheit or below.

The valve arrangement 10 comprises a valve housing 12 which includes an upper section 14 having an elongate bore 16 extending axially therethrough. Bolted to the upper section 14 is a lower section 18 which defines an interior chamber 20 and a flow opening 22 which fluidly communicates with the interior chamber 20.

Figure 3:
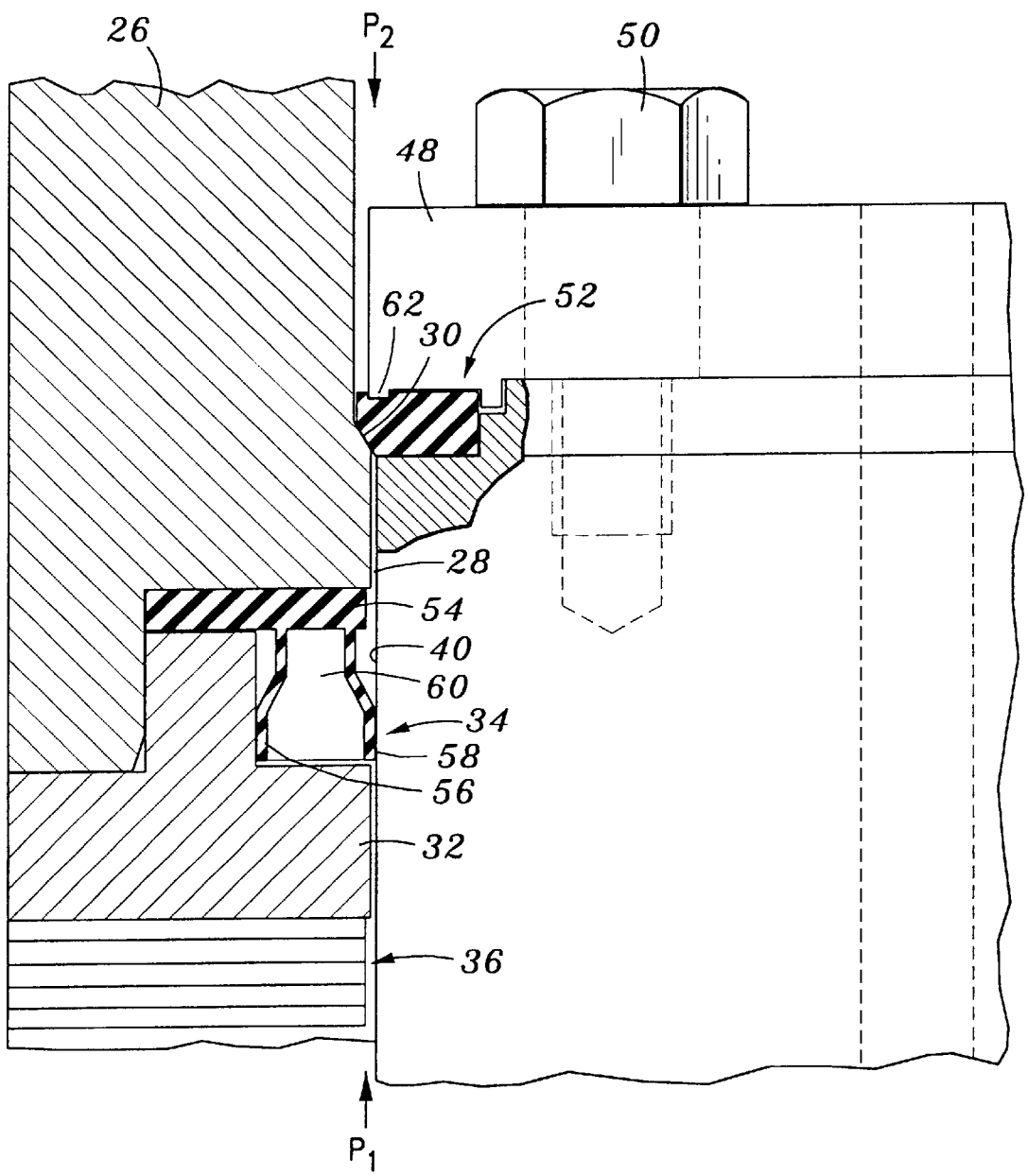
FIG. 3 is an enlargement of the encircled region 3 shown in FIG. 2.

The valve housing 12 further comprises an annular seat ring 24 which is cooperatively engaged to the lower section 18 and at least partially disposed within the flow opening 22. Also included in the valve housing 12 is an annular sleeve 26 which is disposed within the interior chamber 20. The sleeve 26 defines an inner surface 28. As best seen in FIG. 3, the inner surface 28 of the sleeve 26 is not of uniform diameter. Rather, the inner surface 28 includes an annular tapered or ramped portion 30 which defines the transition between upper and lower portions of the inner surface 28, the upper portion being of an increased diameter relative to the lower portion.

The valve housing 12 further comprises an annular bushing 32 which is cooperatively engaged to one end of the sleeve 26. Captured between the sleeve 26 and the bushing 32 is an energized primary seal 34 of the binary balance seal assembly of the present invention. The specific structural and functional attributes of the primary seal 34 will be discussed in more detail below. The valve housing 12 also includes an annular valve cage 36 which, like the sleeve 26 and bushing 32, is disposed within the interior chamber 20 defined by the lower section 18 of the valve housing 12. The valve cage 36 is operatively captured between the bushing 32 and seat ring 24 in the manner shown in FIGS. 1 and 2.

In addition to the valve housing 12, the valve arrangement 10 includes a generally cylindrical valve plug 38 which defines an outer surface 40. The valve plug 38 is fabricated from a metal material, and defines one or more flow holes or apertures 42 which extend through the length thereof, and are used for purposes which will also be described in more detail below. Attached to and extending axially from one end of the valve plug 38 is an elongate shaft or rod 44 which is advanced through the bore 16 within the upper section 14 of the valve housing 12. The end of the valve plug 38 opposite that including the rod 44 extending therefrom defines a seating rim 46. Additionally, attached to the end of the valve plug 38 having the rod 44 extending therefrom is an annular retaining ring 48. The retaining ring 48 is attached to the valve plug 38 via fasteners 50 such as bolts. Captured between the retaining ring 48 and the valve plug 38 is a non-energized secondary seal 52, the structural and functional attributes of which will also be discussed in more detail below.

In the valve arrangement 10, the rod 44 is operatively coupled to an actuator 54 which is operative to reciprocally move the valve plug 38 (and hence the retaining ring 48 and secondary seal 52) between a closed position (shown in FIGS. 2 and 3) and an open position. Though the actuator 54 is shown in FIG. 1 as being a piston actuator, the same may comprise any type of actuator (e.g., manual handwheel, air diaphragm, electric, hydraulic). The movement of the valve plug 38 to the open position occurs as a result of the movement of the rod 44 in the direction shown by the arrow A in FIG. 2. As will be recognized, upon the movement of the valve plug 38 to its open position, the same may be selectively returned to its closed position by the movement of the rod 44 in a direction opposite the direction designated by the arrow A. When the valve plug 38 is in its closed position, the seating rim 46 defined thereby is seated against a complementary engagement surface defined by the seat ring 24. The engagement of the valve plug 38 to the seat ring 24 effectively blocks the flow of fluid into or out of the interior of the valve cage 36. However, the fluid is able to flow through the valve plug 38 via the flow apertures 42 into that region of the interior chamber 20 which is bounded by the upper portion of the inner surface 28 of the sleeve 26, the retaining ring 48 and corresponding end of the valve plug 38, and upper section 14.

Figure 2:
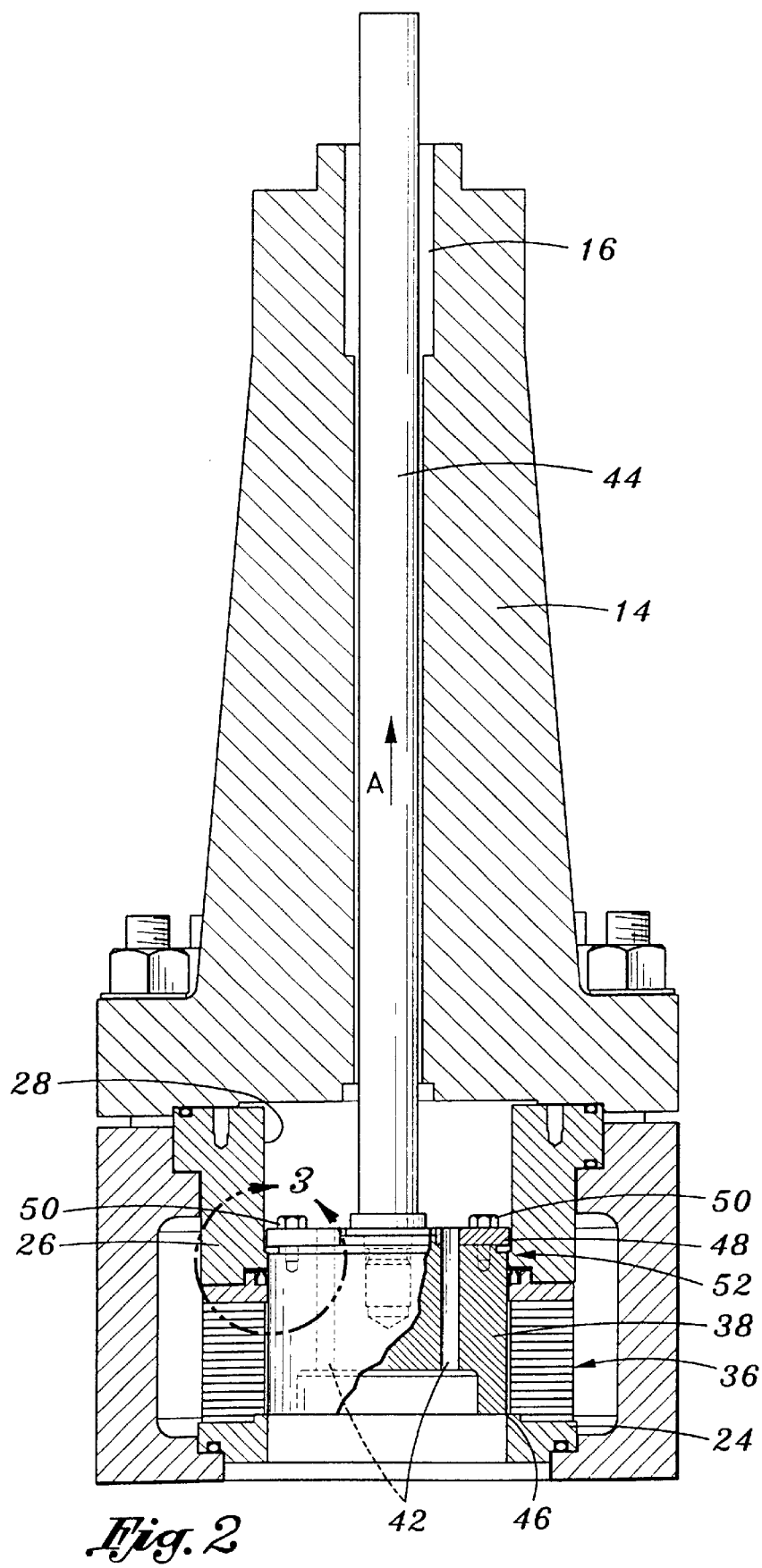
FIG. 2 is an enlarged cross-sectional view of the binary balance seal assembly and valve plug shown in FIG. 1.

As best seen in FIG. 3, the primary seal 34 defines a base 54 having an inner seal leg 56 and an outer seal leg 58 protruding from one end of a common side thereof. The inner and outer seal legs 56, 58 and base 54 collectively define an annular seal well 60. As indicated above, the primary seal 34 is captured between the sleeve 26 and retainer 32. More particularly, the base 54 of the primary seal 34 is captured between the sleeve 26 and retainer 32 such that the inner and outer seal legs 56, 58 reside within a channel or recess partially defined by the retainer 32. In FIGS. 1–3, the primary seal 34 is shown in an over plug flow orientation. When the primary seal 34 is in such orientation, the inner and outer seal legs 56, 58 are oriented within the recess such that they extend to the retainer 32 and the outermost surface of the outer seal leg 58 is substantially flush or continuous with the lower section of the inner surface 28 of the sleeve 26.

When the primary seal 34 is in the over plug flow orientation shown in FIG. 3, fluid flows through the valve cage 36 from the exterior to the interior thereof. The fluid flowing into the interior of the valve cage 36 undergoes a pressure drop as a result of flow through the valve cage 36. When the valve plug 38 in the valve arrangement 10 is moved from its closed position toward its open position, fluid is able to flow downwardly through the seat ring 24, and hence out of the valve arrangement 10. The high pressure fluid still flows through the valve cage 36 and into the interior thereof when the valve plug 38 is in its closed position, thus causing high pressure fluid to be applied to the primary seal 34 in a manner which will be described in more detail below.

The primary seal 34 is preferably fabricated from a soft, deformable material such as virgin polytetrafluorethylene. When the valve plug 38 is in its closed position (i.e., the seating rim 46 is seated against the seat ring 24), the fluid flowing through the valve cage 36 into the interior thereof flows in the direction shown by the arrow P1 in FIG. 3 into the recess partially defined by the retainer 32 and hence into the seal well 60 of the primary seal 34. The high pressure fluid within the seal well 60 facilitates the outward flexion or deformation of the outer seal leg 58 into sealed engagement with the outer surface 40 of the valve plug 38. At the same time, that portion of the interior of the sleeve 26 which is circumvented or bounded by the upper portion of the inner surface 28 is exposed to fluid pressure attributable to the fluid communication thereof with the downstream pressure condition (i.e., the pressure downstream of the valve plug 38/seat ring 24) via the flow paths defined by the flow apertures 42 extending through the valve plug 38. This downstream fluid pressure within the interior of the sleeve 26 would normally be able to flow over the ramped portion 30 of the inner surface 28 and along the lower portion thereof in the direction shown by the arrow P2 in FIG. 3 to the primary seal 34.

It will be recognized that in the over plug flow orientation shown in FIG. 3, the pressure of the fluid flowing in the direction P1 exceeds that flowing in the direction P2 since, as indicated above, the fluid flowing in the direction P2 is at downstream pressure due to the flow paths provided by the flow apertures 42 within the valve plug 38. Thus, when the valve plug 38 is in its closed position, the higher pressure fluid flowing in the direction P1 is able to spread the inner and outer seal legs 56, 58 thus bringing the outer seal leg 58 into sealed engagement with the outer surface 40 of the valve plug 38. Such sealed engagement would normally prevent any leakage of such higher pressure fluid downstream of the valve plug 38 despite the same being in its closed position. As will be recognized, such downstream leakage could occur if the seal between the outer seal leg 58 and the valve plug 38 was compromised, which would allow the higher pressure fluid to flow into the region of the interior chamber 20 bounded by the upper portion of the inner surface 28 of the sleeve 26, and downstream of the valve plug 38 via the flow apertures 42 thereof. The secondary seal 52 prevents such downstream leakage in the event the integrity of the seal between the primary seal 34 and the valve plug 38 is compromised, as will be described in more detail below.

As best seen in FIG. 3, the secondary seal 52 has a generally rectangular cross-sectional configuration, and is preferably fabricated from the same material as the primary seal 34, i.e., virgin polytetrafluorethylene. However, those of ordinary skill in the art will recognize that the primary and secondary seals 34, 52 may be fabricated from different materials. As indicated above, the annular secondary seal 52 is captured between the valve plug 38 and the retaining ring 48 secured to one end thereof. More particularly, the secondary seal 52 is positioned upon an annular shoulder formed in and extending about the periphery of one end of the valve plug 38, and is partially received into an annular recess formed in one side of the retaining ring 48 and partially defined by a radially spaced pair of protuberances 62 thereof. Importantly, the protuberance 62 of the pair disposed most radially outward is effectively embedded within the secondary seal 52 and is used to assist in preventing the migration of the secondary seal 52 radially outwardly from between the valve plug 38 and the retaining ring 48.

When the valve plug 38 is moved to its closed position, a corner region of the secondary seal 52 is brought into sealed engagement with the ramped portion 30 of the inner surface 28 of the sleeve 26. As indicated above, the valve arrangement 10 is particularly suited for use in cryogenic service applications. In this application, the movement of the valve plug 38 to its closed position substantially reduces the fluid pressure level applied to the primary seal 34 and hence the seal well 60 along the valve cage 36 and retainer 32 in the direction P1. This reduced pressure level (which may be five psi or less), coupled with the extremely low fluid temperature, causes the primary seal 34 to lose its softness/resiliency, thus compromising the integrity of the seal between the outer seal leg 58 and the outer surface 40 of the valve plug 38. As a result, in the absence of the secondary seal 52, the higher pressure fluid flowing in the direction P1 shown in FIG. 3 could flow past the primary seal 34 (due to the compromise in the integrity of the seal created with the valve plug 38), and thus facilitate leakage downstream of the valve plug 30 as a result of flow through the flow apertures 42 of the valve plug 38. This undesirable leakage is prevented by the secondary seal 52 which, as indicated above, it brought into sealed engagement with the ramped portion 30 of the inner surface 28 when the valve plug 38 is moved or actuated to its closed position.

Thus, the primary and secondary seals 34, 52 work in concert with each other to effectively prevent upstream pressure from causing fluid to leak downstream of the valve plug 38 when the valve arrangement 10 is used in a cryogenic service application. When the valve plug 38 is moved from its closed position toward its open position, the secondary seal 52 is removed from its sealed engagement to the ramped portion 30. As a result, the pressure of the fluid flowing toward the primary seal 34 in the direction P1 is substantially equal to the pressure of the fluid flowing toward the primary seal 34 in the direction P2, with the resultant "balance" of pressure on each side of the seal created between the outer seal leg 58 and the outer surface 40 of the valve plug 38 significantly reducing the force required to facilitate the movement of the valve plug 38 to its fully open position and thereafter back to its closed position.

Figure 4:
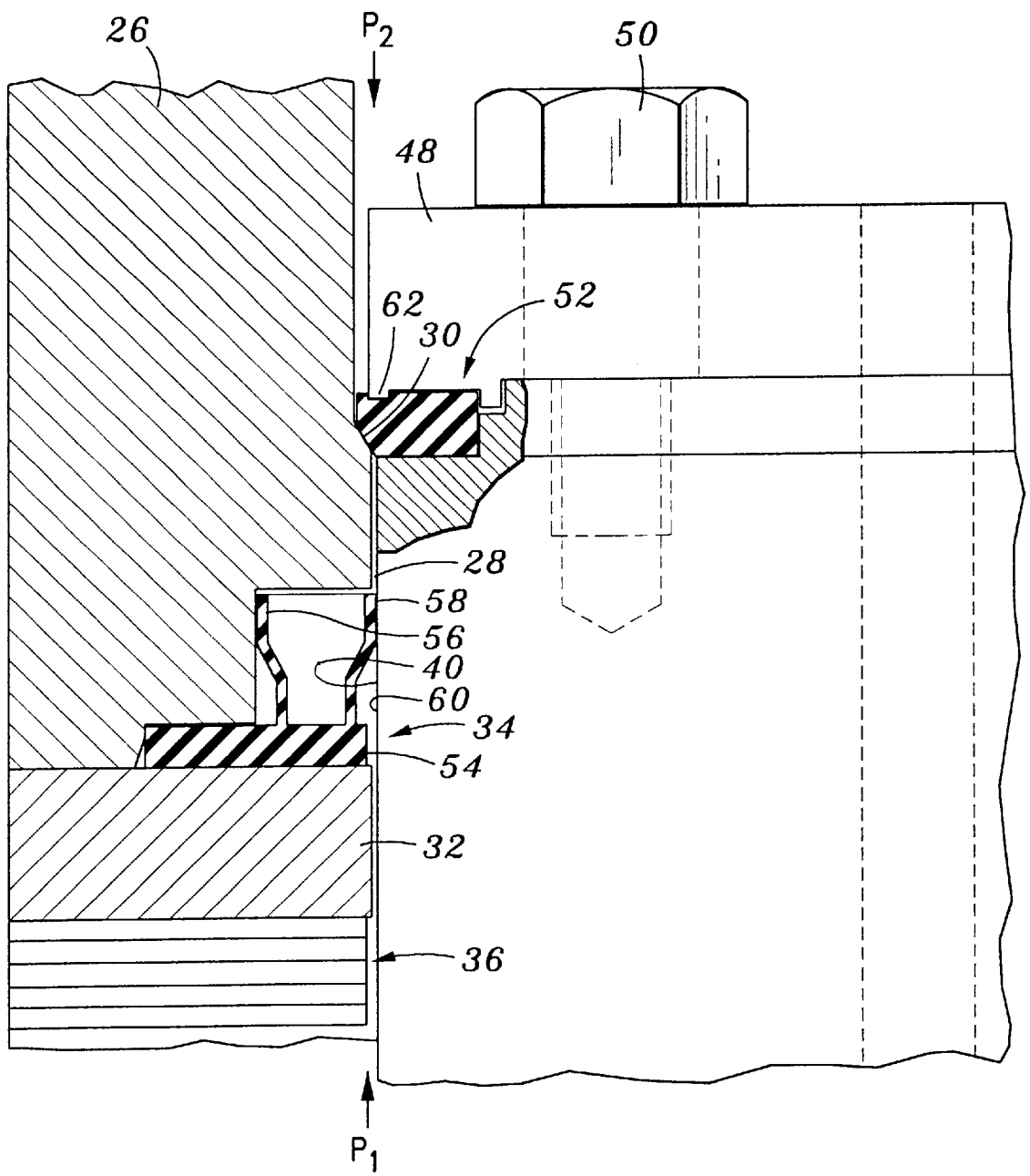
FIG. 4 is an enlarged view similar to FIG. 3, showing the primary seal of the binary balance seal assembly in an under plug flow orientation.

Referring now to FIG. 4, the primary seal may alternatively be oriented in an under plug flow orientation within the channel or recess partially defined by the retainer 32. When the primary seal 34 is in the under plug flow orientation, the inner and outer seal legs 56, 58 are oriented within the recess such that the extend to the sleeve 26 and the outermost surface of the outer seal leg 58 is substantially flush or continuous with the lower section of the inner surface 28 of the sleeve 26.

When the primary seal 34 is in the under plug flow orientation shown in FIG. 4 and the valve plug 38 of the valve arrangement 10 is in its closed position, high pressure fluid is blocked from entering the interior of the valve cage 36 due to the sealed engagement between the seating rim 46 and the seat ring 24. However, the high pressure fluid is able to flow through the flow apertures 42 extending through the valve plug 38 and into that region of the interior chamber 20 which is circumvented by the upper portion of the inner surface 28 of the sleeve 26. In the absence of the secondary seal 52, the high pressure fluid in this section of the interior chamber 20 would flow over the ramped portion 30 of the inner surface 28 and along the lower portion thereof in the direction shown by the arrow P2 in FIG. 4 to the primary seal 34. With the valve plug 38 being in its closed position, such higher pressure fluid flowing in the direction P2 would be able to spread the inner and outer seal legs 56, 58, thus bringing the outer seal leg 58 into sealed engagement with the outer surface 40 of the valve plug 38. However, a compromise in the integrity of the seal between the primary seal 34 and the valve plug 38 could result in downstream leakage attributable to the fluid flowing between the primary seal 34 and valve plug 38 into the interior of the disk cage 36 and radially outward through the flow passages defined thereby.

In the under plug flow orientation shown in FIG. 4, the sealed engagement between the secondary seal 52 and the ramped portion 30 of the inner surface 28 prevents any such downstream leakage since the higher pressure fluid flowing in the direction P2 is prevented from reaching the primary seal 34. Thus, the primary seal 54 in the under plug flow orientation essentially operates as a back-up to the secondary seal 52, which is in contrast to the over plug flow orientation shown in FIG. 3 wherein the secondary seal 52 operates as a back-up to the primary seal 34.

When the valve plug 38 shown in FIG. 4 is moved from its closed position toward its open position, the secondary seal 52 is removed from its sealed engagement to the ramped portion 30. Additionally, the high pressure fluid is able to flow into the interior of the valve cage 36 via the flow opening 22 and seat ring 24, with such high pressure fluid flowing from the interior of the valve cage 36 radially outward therethrough into that portion of the interior chamber 20 defined between the valve cage 36 and the lower section 18. The fluid, which undergoes a pressure drop as a result of flow through the valve cage 36, flows into an outflow opening (not shown) which fluidly communicates with the interior chamber 20. As a result of the secondary seal 52 being removed from its sealed engagement to the ramped portion 30, the pressure of the fluid flowing toward the primary seal 34 in the direction P1 shown in FIG. 4 is substantially equal to the pressure of the fluid flowing toward the primary seal 34 in the direction P2, with the resultant "balance" of pressure on each side of the seal created between the outer seal leg 58 and the outer surface 40 of the valve plug 38 significantly reducing the force required to facilitate the movement of the valve plug 38 to its fully open position and thereafter back to its closed position.

Additional modifications and improvements of the present invention may also be apparent to those of ordinary skill in the art. For example, the sleeve 26 could be formed to define a generally flat, annular shoulder as an alternative to the ramped portion 30, with the shoulder separating and extending generally perpendicularly between the upper and lower portions of the inner surface 28. In this regard, the secondary seal 52 would be sized to be brought into sealed engagement with the shoulder when the valve plug 38 is actuated to its closed position. Thus, the particular combination of parts described and illustrated herein is intended to represent only certain embodiments of the present invention, and is not intended to serve as limitations of alternative devices within the spirit and scope of the invention.

What is claimed is:

1. A binary balance seal assembly for use in a balanced pressure valve having a valve housing and a valve plug movable within the valve housing between an open position and a closed position, the seal assembly comprising:
    a primary seal adapted to be retained within the valve housing and forced into sealed engagement with the valve plug when the valve plug is moved from the closed position toward the open position; and
    a secondary seal adapted to be retained within the valve plug and forced into sealed engagement with the valve housing when the valve plug is moved to the closed position.

2. The seal assembly of claim 1 wherein the primary seal is annular and comprises:
    a central opening sized to accommodate the valve plug; and
    an annular seal well separated from the central opening by an annular seal leg;
    the seal leg being deformable upon the application of pressure to the seal well such that a portion of the seal leg is forced into sealed engagement with the valve plug.

3. The seal assembly of claim 2 wherein the primary seal is fabricated from virgin polytetrafluorethylene.

4. The seal assembly of claim 1 wherein the secondary seal is annular and has a generally rectangular cross-sectional configuration.

5. The seal assembly of claim 4 wherein the secondary seal is fabricated from virgin polytetrafluorethylene.

6. A balanced pressure valve comprising:
    a valve housing;
    a valve plug movable within the valve housing between an open position and a closed position; and
    a binary balance seal assembly comprising:
        a primary seal retained within the valve housing and forceable into sealed engagement with the valve plug upon the application of pressure to the primary seal when the valve plug is moved from the closed position toward the open position; and
        a secondary seal retained within the valve plug and forceable into sealed engagement with the valve housing when the valve plug is moved to the closed position.

7. The valve of claim 6 wherein the primary seal is annular and comprises:
    a central opening sized to accommodate the valve plug; and
    an annular seal well separated from the central opening by an annular seal leg;
    the seal leg being deformable upon the application of pressure to the seal well such that a portion of the seal leg is forced into sealed engagement with the valve plug.

8. The valve of claim 7 wherein the primary seal is fabricated from virgin polytetrafluorethylene.

9. The valve of claim 6 wherein the secondary seal is annular and has a generally rectangular cross-sectional configuration.

10. The valve of claim 9 wherein the secondary seal is fabricated from virgin polytetrafluorethylene.

11. The valve of claim 6 wherein:
    the valve housing has an interior surface which defines a ramped portion; and
    the secondary seal of the seal assembly is movable into sealed engagement with the ramped portion of the interior surface when the valve plug is moved to the closed position.

12. A method of preventing downstream leakage in a balanced pressure valve having a valve housing and a valve plug moveable within the valve housing between an open position and a closed position, the method comprising the steps of:
    a) positioning a primary seal within the valve housing such that the primary seal is forceable into sealed engagement with the valve plug upon the application of pressure to the primary seal; and
    b) positioning a secondary seal within the valve plug such that the secondary seal is forceable into sealed engagement with the valve housing when the valve plug is moved to the closed position.

13. The method of claim 12 wherein the valve housing has an interior surface which defines a ramped portion, and step (b) comprises moving the secondary seal into sealed engagement with the ramped portion of the interior surface when the valve plug is moved to the closed position.

* * * * *